Aug. 28, 1956 D. E. AUSTIN 2,760,559
HEADREST FOR VEHICLE
Filed March 27, 1953 15 Sheets-Sheet 2
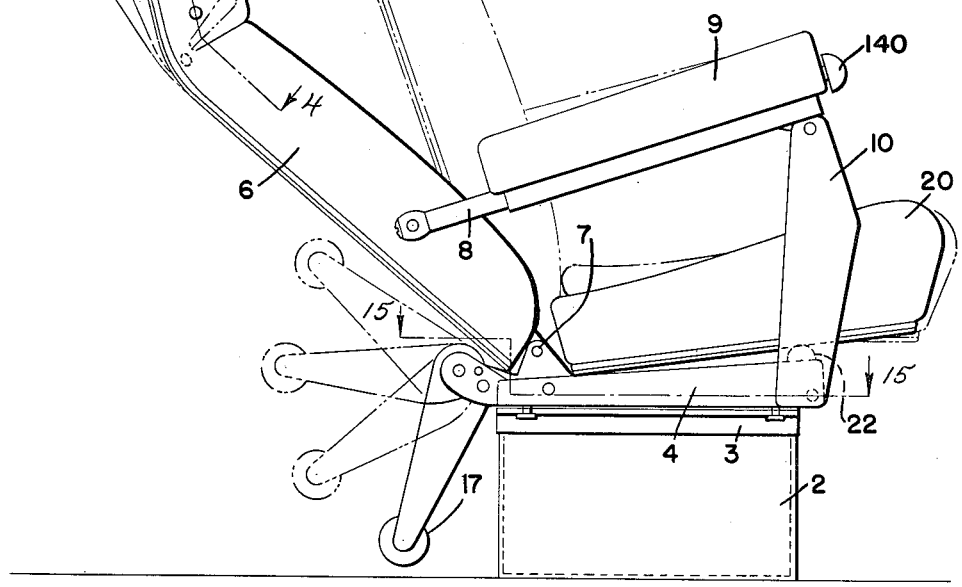
INVENTOR.
DWIGHT E. AUSTIN
BY
ATTORNEY

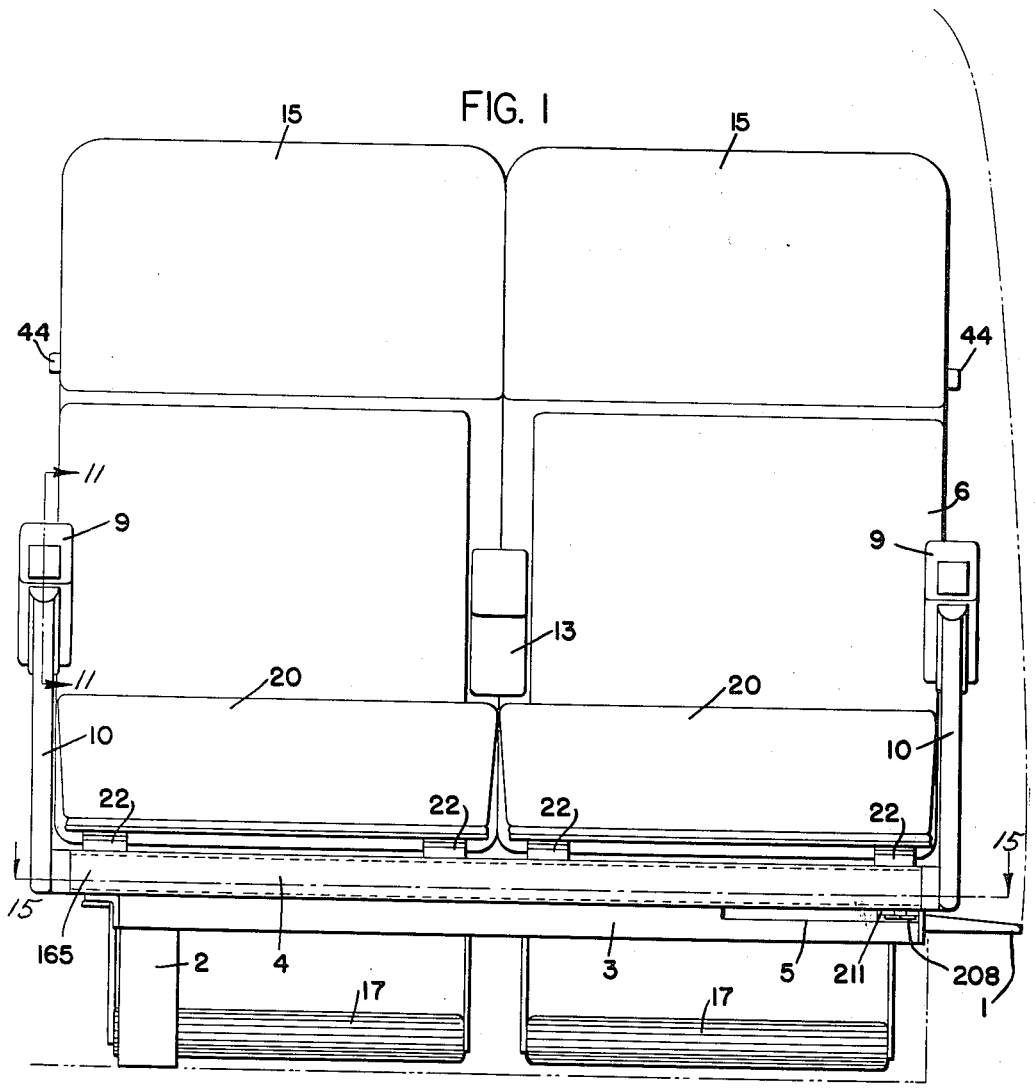

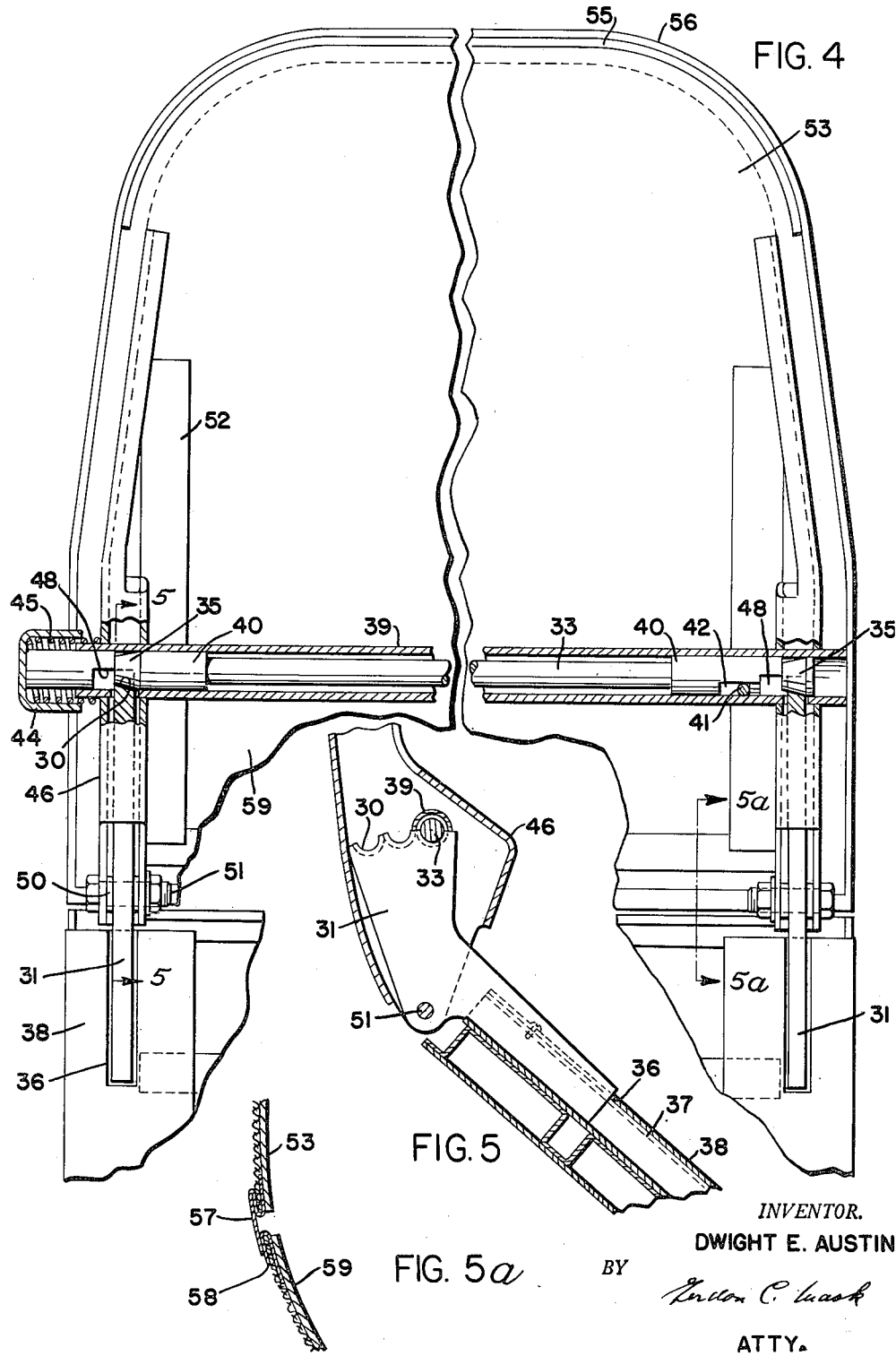

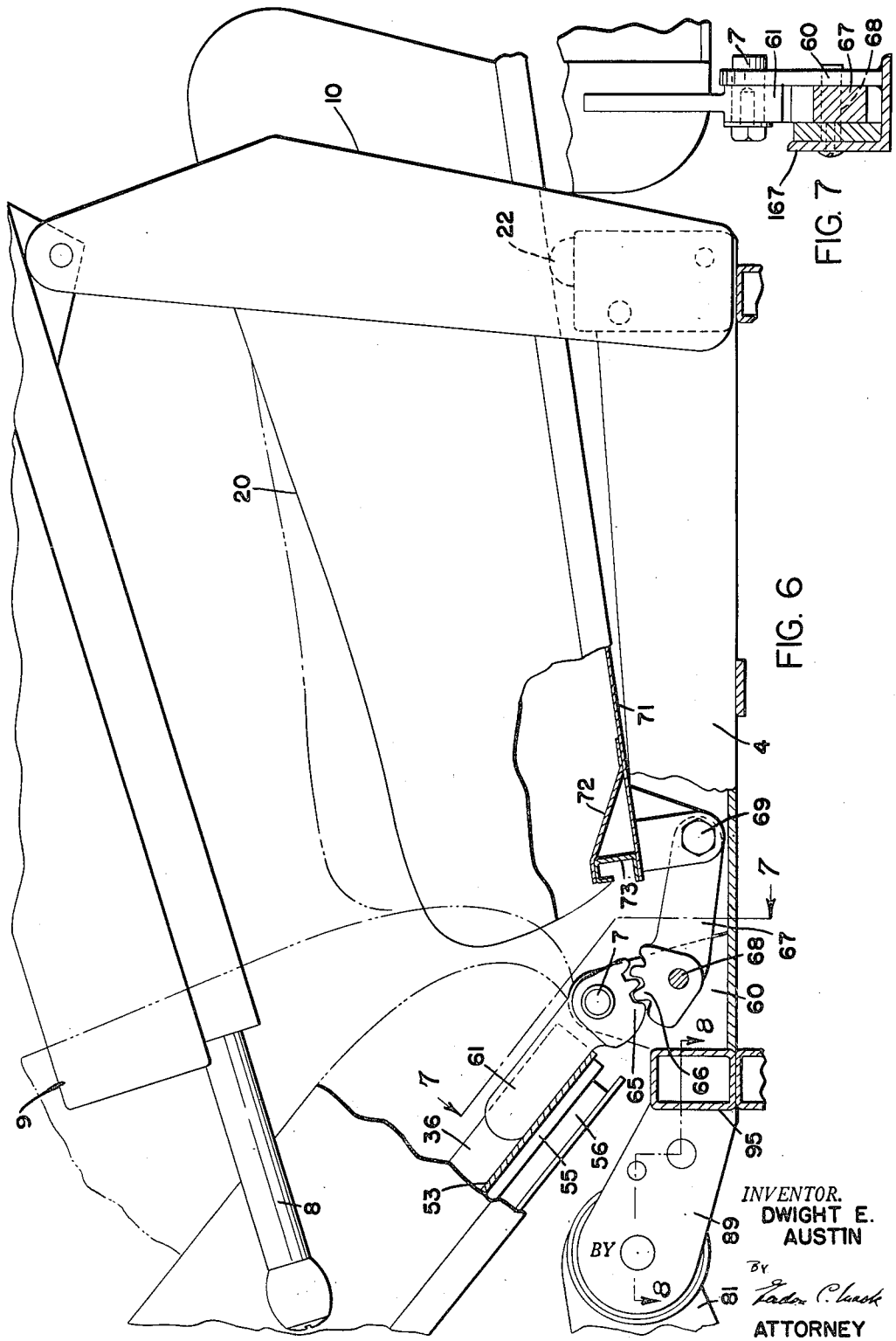

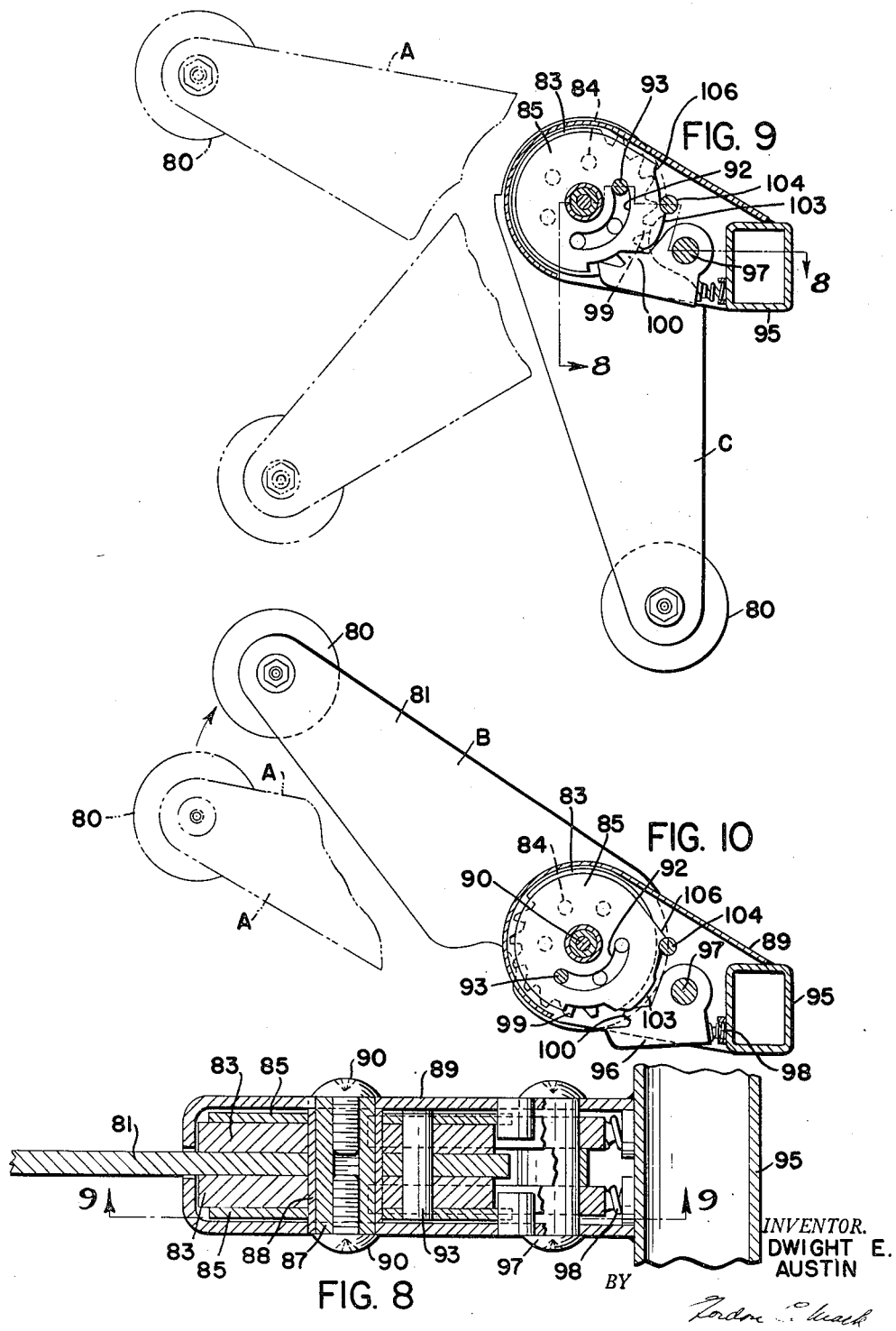

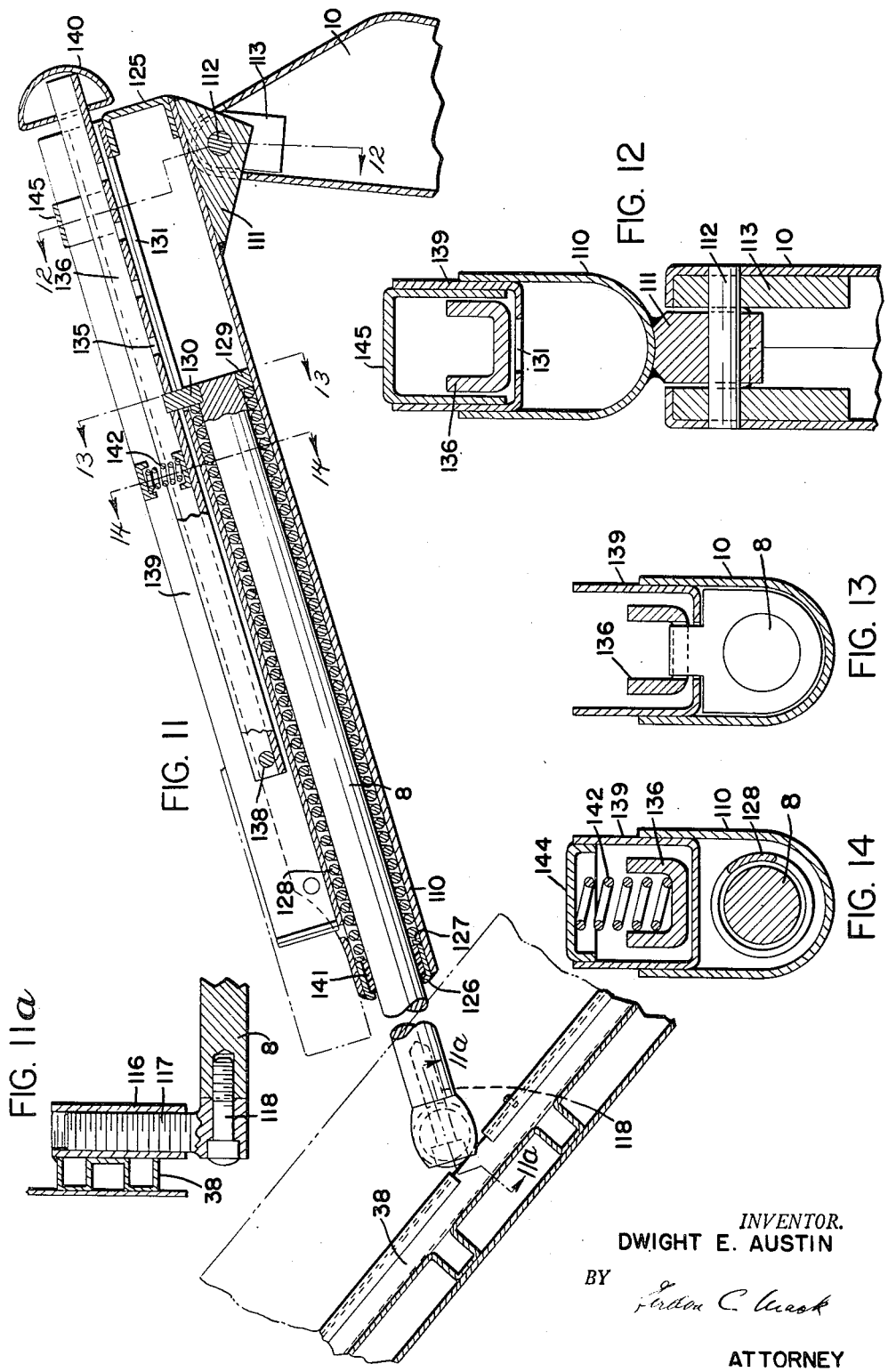

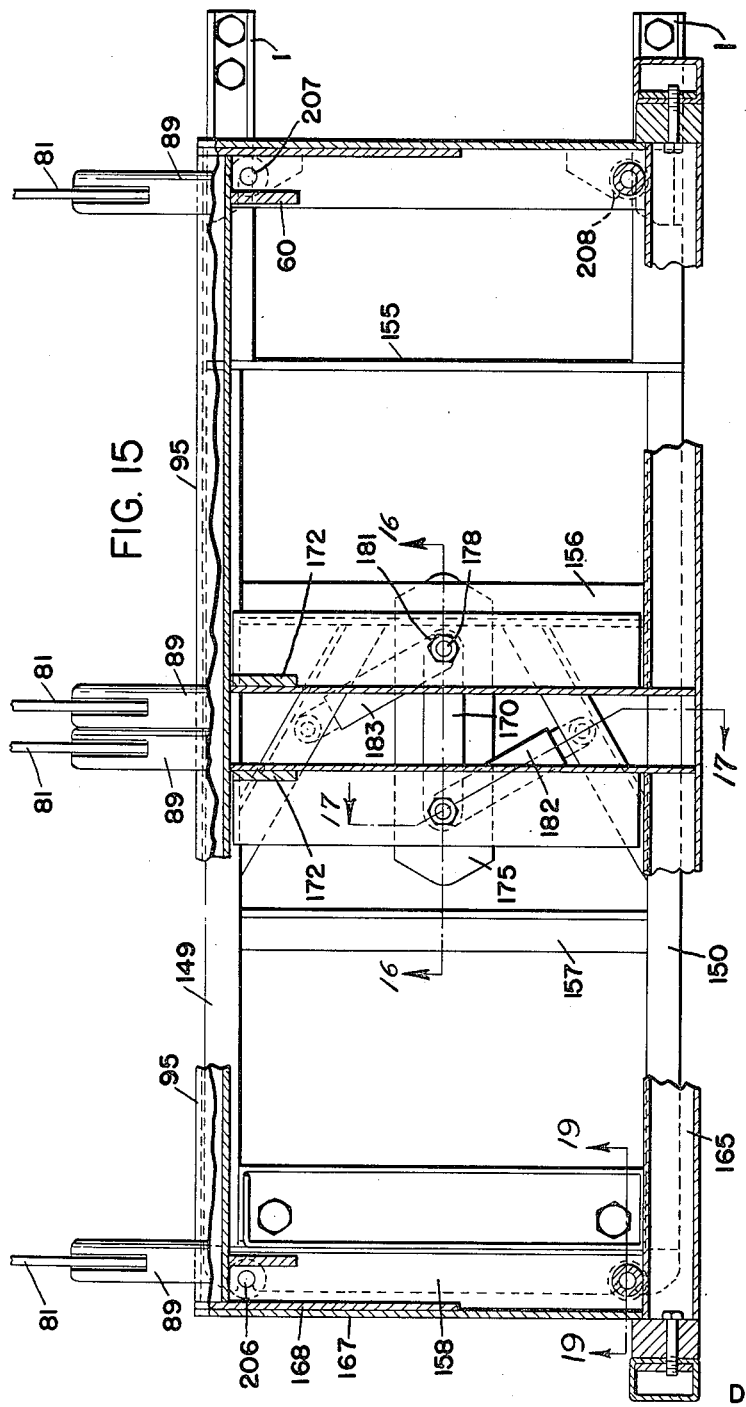

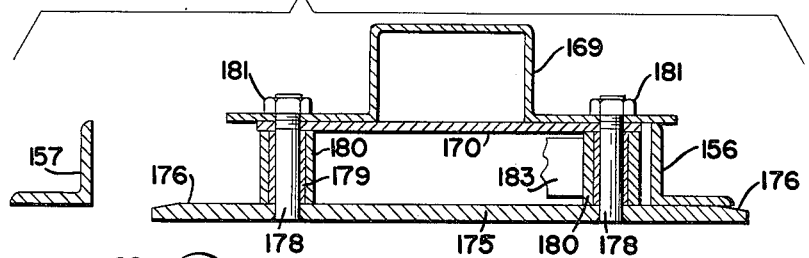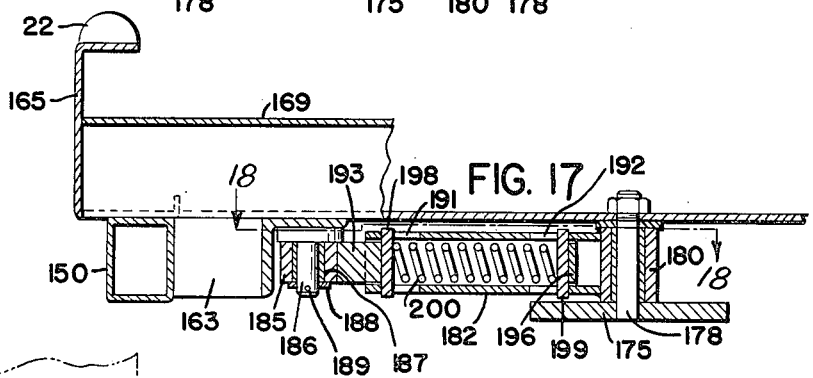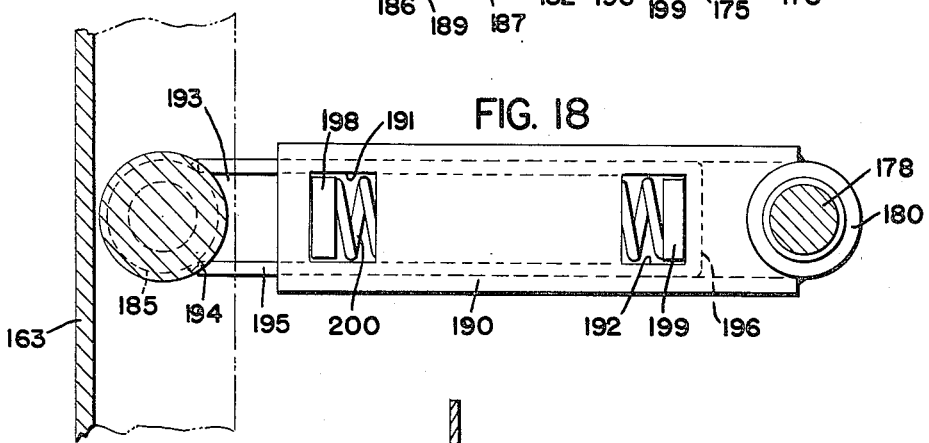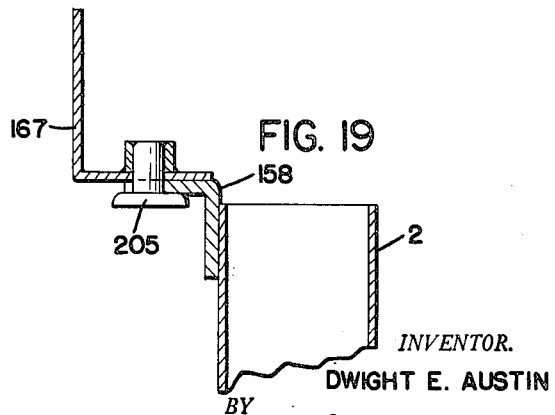

Aug. 28, 1956 — D. E. AUSTIN — 2,760,559
HEADREST FOR VEHICLE
Filed March 27, 1953 — 15 Sheets-Sheet 9

INVENTOR.
DWIGHT E. AUSTIN
ATTORNEY

Aug. 28, 1956  D. E. AUSTIN  2,760,559
HEADREST FOR VEHICLE
Filed March 27, 1953  15 Sheets-Sheet 11

INVENTOR.
DWIGHT E. AUSTIN
BY
*Gordon C. Mack*
ATTORNEY

Aug. 28, 1956   D. E. AUSTIN   2,760,559
HEADREST FOR VEHICLE
Filed March 27, 1953   15 Sheets-Sheet 12
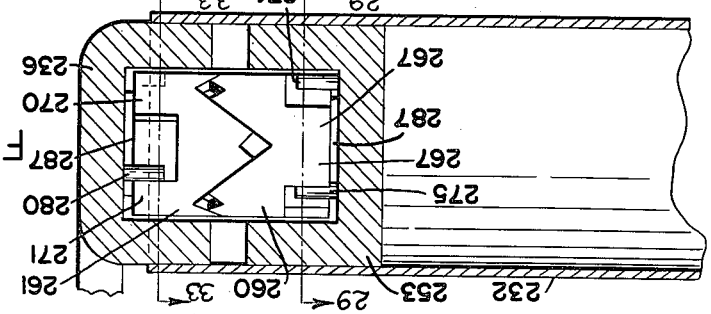
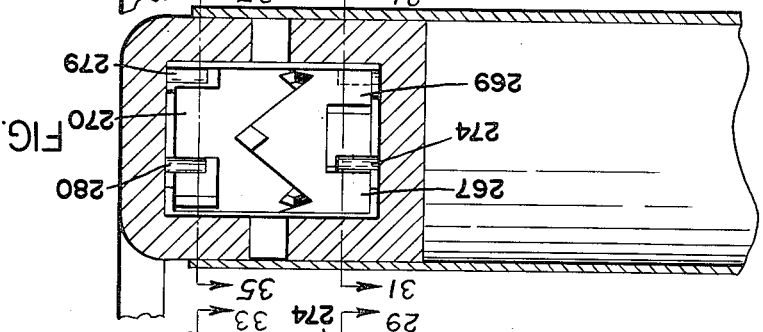
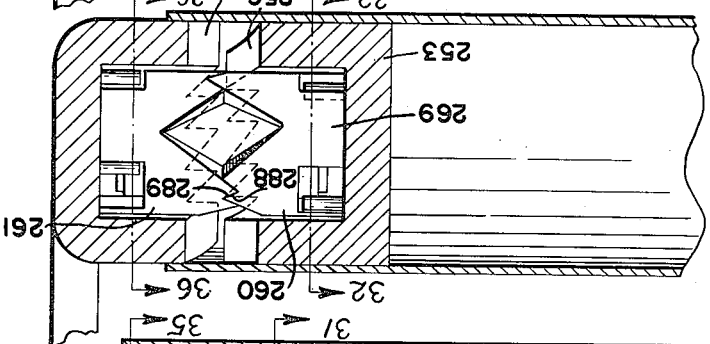
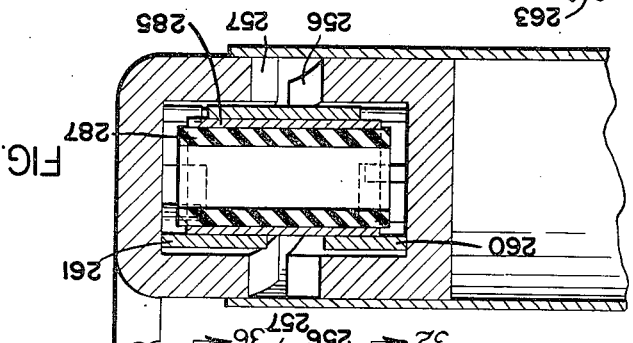
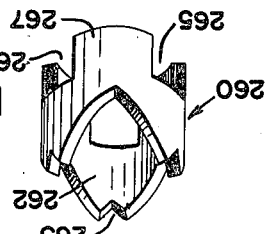
INVENTOR.
DWIGHT E. AUSTIN
BY
ATTORNEY Aug. 28, 1956     D. E. AUSTIN     2,760,559
HEADREST FOR VEHICLE
Filed March 27, 1953     15 Sheets-Sheet 13
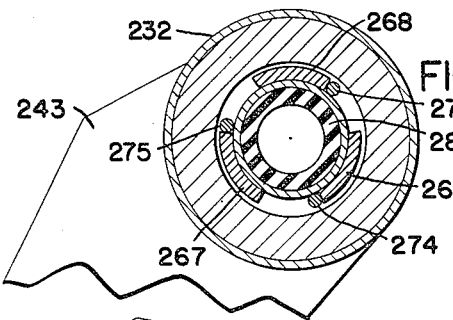
FIG. 29
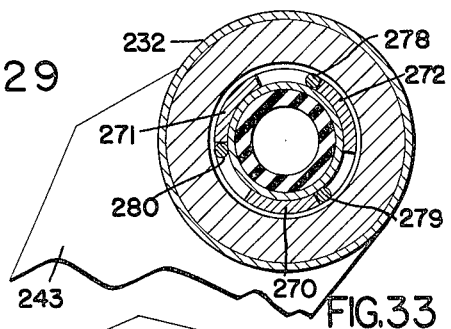
FIG. 33
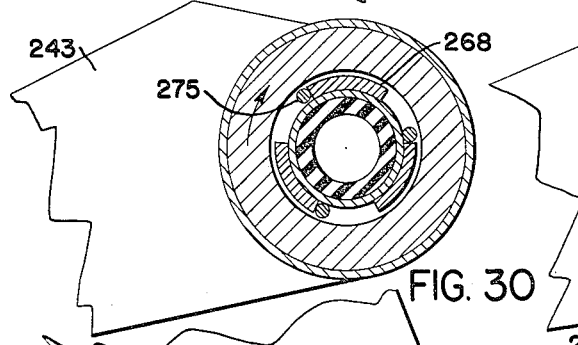
FIG. 30
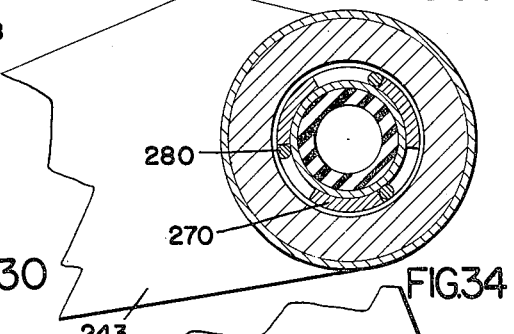
FIG. 34
FIG. 31
FIG. 35
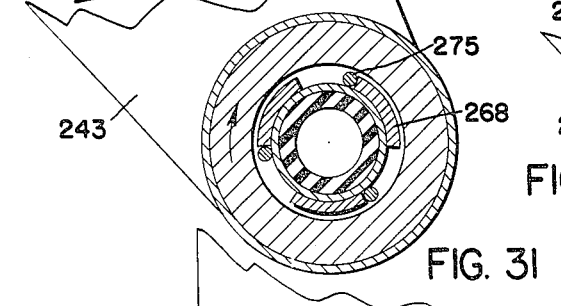
FIG. 32
FIG. 36
INVENTOR.
DWIGHT E. AUSTIN
BY
ATTORNEY

*INVENTOR.*
DWIGHT E. AUSTIN
BY
*Gordon C. Mask*
ATTORNEY

United States Patent Office 2,760,559
Patented Aug. 28, 1956

2,760,559

HEADREST FOR VEHICLE

Dwight Edwin Austin, Kent, Ohio

Application March 27, 1953, Serial No. 344,980

4 Claims. (Cl. 155—177)

This invention relates to a vehicle seat designed particularly for installation in a railroad car, although it may be used in other vehicles. The seat is preferably designed to hold two persons, but it may be designed to hold a single person or more than two persons. It involves a number of novel features.

The seat includes a fixed base upon which the upper portion is rotatable so that it may be faced in one direction when the vehicle is moving in that direction, and faced in the reverse direction when the vehicle is moving in the reverse direction. The reversing means includes extensible and compressible links which connect the fixed lower base and a rotatable upper base. These links permit the seat to be shifted inwardly, as toward the aisle of the railroad car when the seat is to be reversed. Locking means is provided which prevents rotation of the upper portion of the chair.

The seat is equipped with a reclining back and a seat portion which are pivotally attached. As the back is reclined the rear of the seat portion is lowered. This tends to increase the length of the back and prevent the seat from slipping out. The means for lowering the back is novel. It includes latch mechanism which includes a compressed spring to facilitate raising the back. The weight of the passenger on the back tends to lower it to the reclining position. The latch mechanism includes means which cooperates with openings in a latch channel pivoted at one end and which may be pivotally raised about said cooperating means to disengage it from the respective openings.

The head rest is pivoted to the top of the back. The position of the head rest with respect to the back is controlled by the engagement of a latch rod with indentations provided in the wide edge of latch quadrants located on opposite sides of the head rest. The engaging portions of the rod and quadrant are tapered at any angle that provides a positive lock and also releases easily, and the rod is spring pressed toward the quadrant to engage it and prevent rattling. The rod is enclosed in a housing and a push button permits disengagement of the tapered portions of the rod from the quadrant. The angle of the head rest is adjustable when the parts are disengaged. The push button mechanism may be located conveniently at the side or top of the seat or elsewhere.

The seat is equipped with a foot rest, and where the seat is designed for a plurality of persons a separate foot rest is advantageously provided for each person. The foot rest is pivotally mounted and ratchet means is provided for holding the foot rest at any one of several different angles. Once the foot rest is raised it may be returned to the lowered position automatically by raising it to an angle pointing upwardly from the highest angle to which it is held by the ratchet.

The chair includes novel upholstery-holding means and other features which are shown and will be more fully explained in connection with the accompanying drawings. In the drawings—

Fig. 1 is an elevation of the front of a double seat;

Fig. 2 is a side view showing the back in a lowered position, and in a raised position in dot-dash lines. It shows both the head rest and the foot rest in several different positions;

Fig. 3 is a detail showing means for fastening the upholstery;

Fig. 4 is a section through the head rest on the line 4—4 of Fig. 2;

Fig. 5 is a section of the head-rest latch mechanism on the line 5—5 of Fig. 4;

Fig. 5a is a section on line 5a—5a of Fig. 4;

Fig. 6 is an enlarged view of the seat and the base of the back, with a part broken away to more clearly show how the back and seat portion are joined;

Fig. 7 is a detail on the line 7—7 of Fig. 6 showing the back support;

Fig. 8 is a section on the lines 8—8 of Figs. 6 and 9, showing the foot-rest ratchet mechanism;

Fig. 9 is a section of this ratchet mechanism on the line 9—9 of Fig. 8;

Fig. 10 is a view identical with Fig. 9 but with the foot rest elevated to show how the ratchet mechanism is disengaged;

Fig. 11 is a section through the arm on the line 11—11 of Fig. 1 and shows the latch mechanism which permits the back to be raised and lowered;

Fig. 11a is a section on line 11a—11a of Fig. 11;

Fig. 12 is a section through the front of the arm, and arm support on the line 12—12 of Fig. 11;

Figure 20:
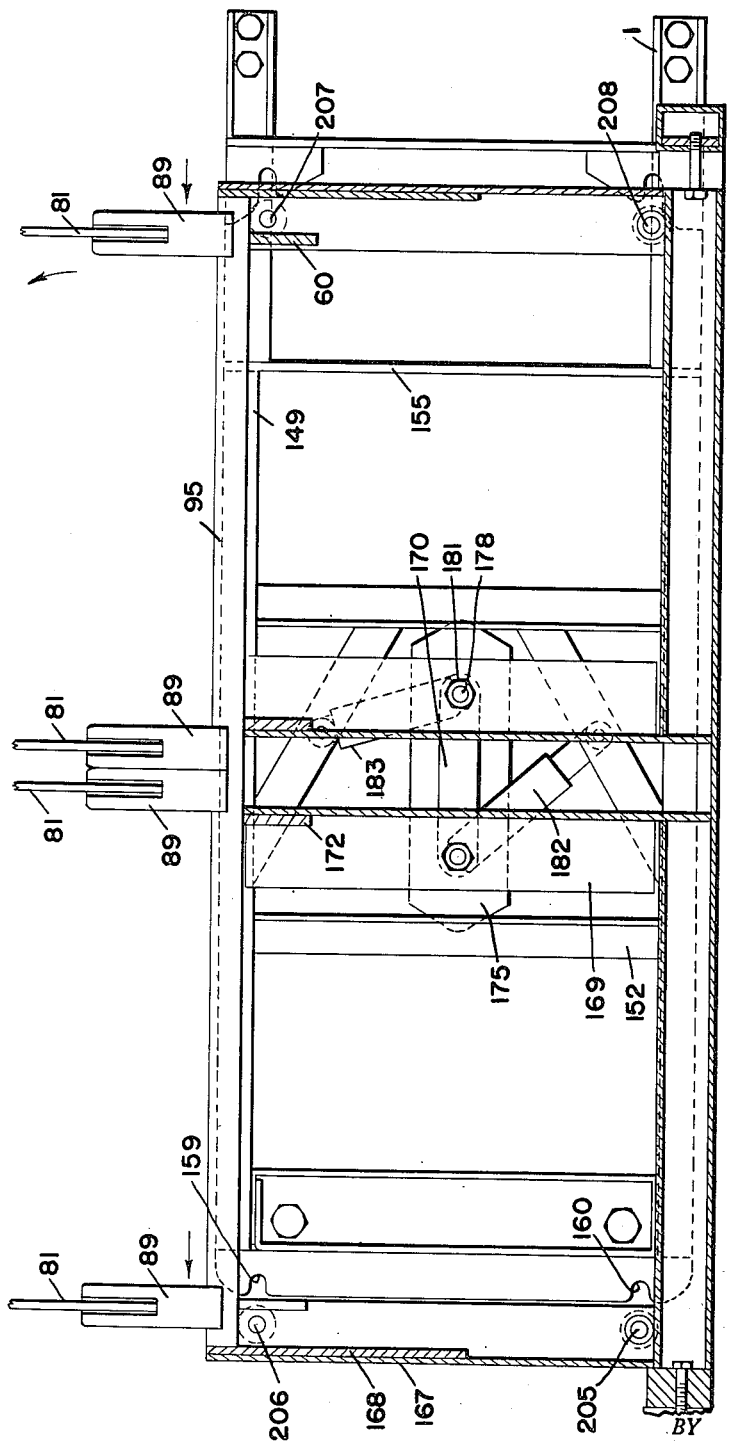
Figure 21:
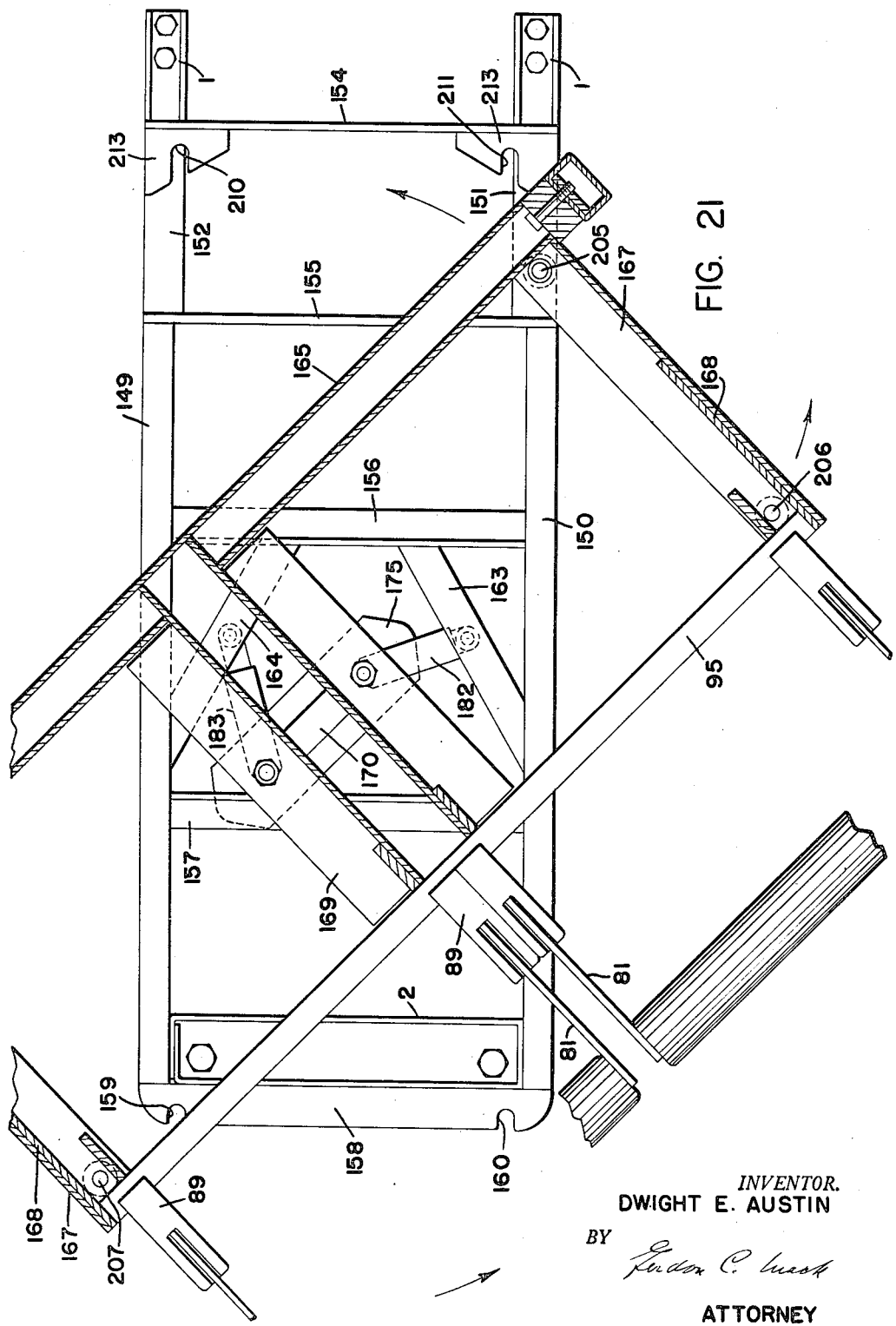
Figure 22:
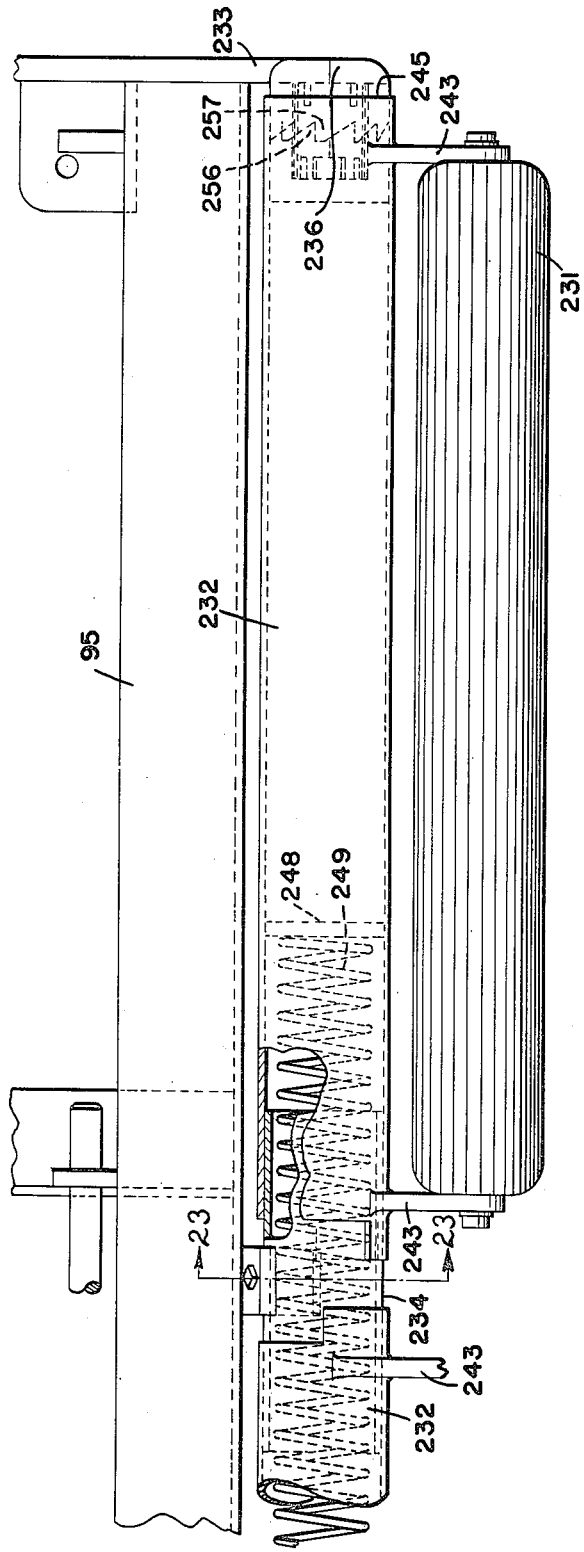
Figure 23:
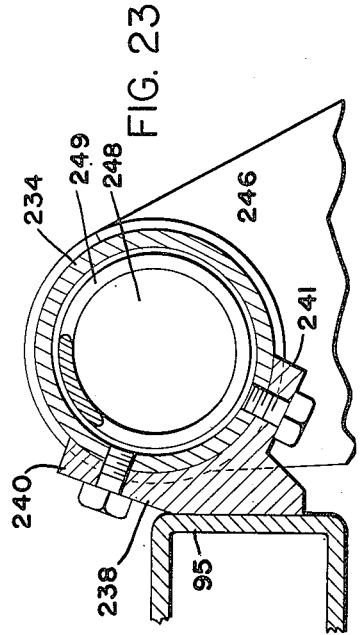

Figs. 13 and 14 are sections on the lines 13—13 and 14—14 of Fig. 11, showing different sections through the arm;

Fig. 15 is a view of the upper and lower base assemblies on the lines 15—15 of Figs. 1 and 2, with the base assemblies locked and the chair facing the bottom of the sheet;

Fig. 16 is a section through the central portion of the base assemblies on the line 16—16 of Fig. 15;

Fig. 17 is a detail of the link mechanism and surrounding parts on the line 17—17 of Fig. 15;

Fig. 18 is a plan view of the link mechanism on the line 18—18 of Fig. 17;

Fig. 19 is a section through one unit of the locking mechanism on the line 19—19 of Fig. 15;

Fig. 20 is a view similar to Fig. 15 but with the upper base assembly shifted inwardly so that the locking mechanism is disengaged, the extent of the shift being exaggerated to clarify the illustration, being actually only sufficient to disengage the locking mechanism;

Fig. 21 is a view similar to Figs. 15 and 20 but with the upper base assembly turned and almost in the reverse of the position shown in Figs. 15 and 20;

Fig. 22 is a plan view of an alternative form of foot rest in the lowered position;

Fig. 23 is a section on the line 23—23 of Fig. 22;

Fig. 24 is a section through the operating mechanism of this alternative foot rest on line 24—24 of Fig. 22, with the foot rest in the lowered position. This Fig. 24 shows the ratchet teeth of the foot rest engaged with one another as will be explained in what follows.

Figure 37:
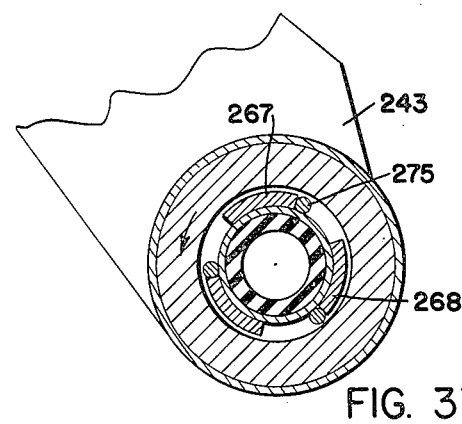
Figure 40:
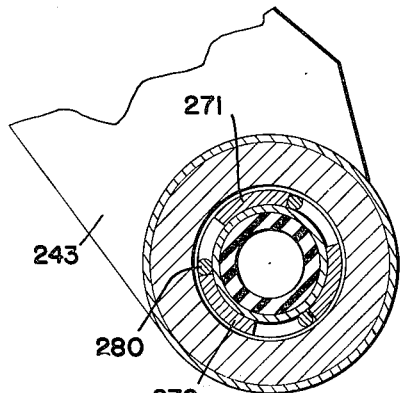
Figure 38:
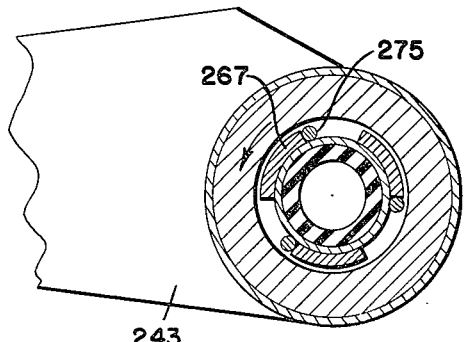
Figure 41:
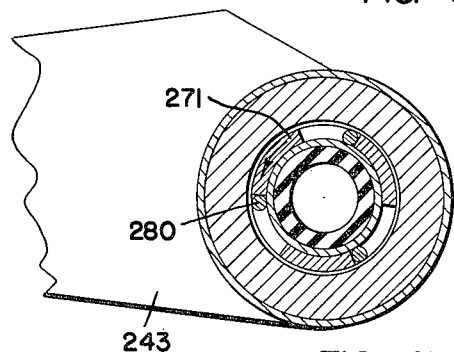
Figure 39:
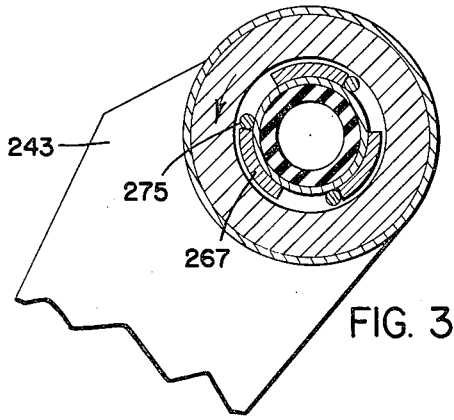
Figure 42:
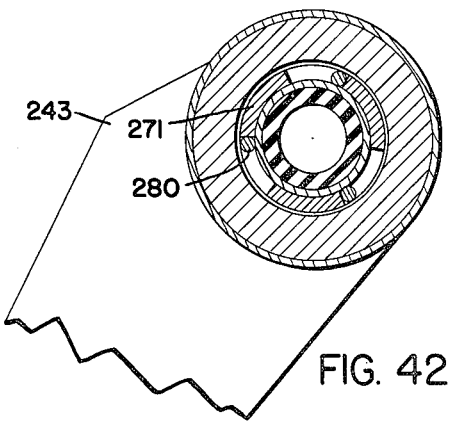
Figure 43:
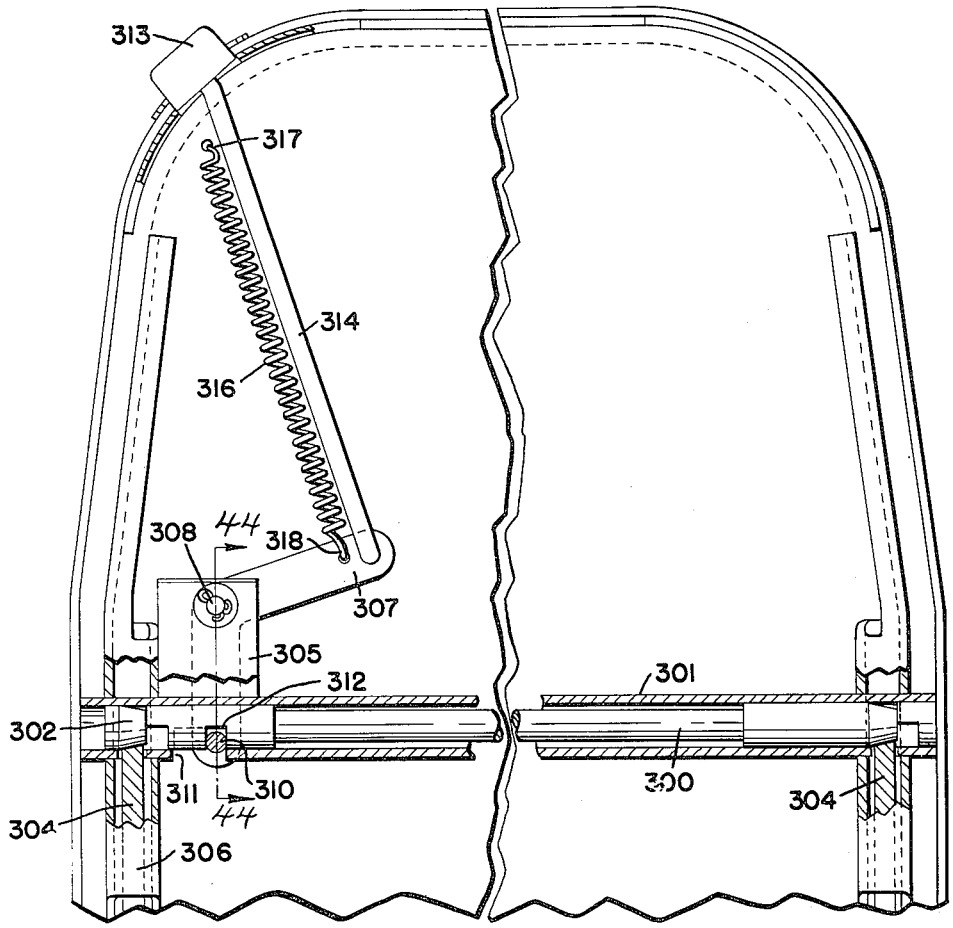
Figure 44:
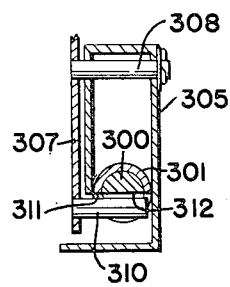

Fig. 25 is a view similar to Fig. 24, with the ratchet teeth engaged, and the foot rest partly raised;

Fig. 26 is a view similar to Fig. 24, but with the foot rest in the top position, and the ratchet teeth disengaged;

Fig. 27 is a view similar to that shown in Fig. 26, but with the ratchet releases shown in section;

Fig. 28 is a perspective view of one of the ratchet releases;

Figs. 29–32 are sections through the end of the ratchet mechanism shown in Figs. 24–27; Fig. 28 being a section on the line 29—29 of Fig. 24 with the foot rest down; Fig. 31 being a section on the line 31—31 of Fig. 25 with the foot rest partially raised; Fig. 32 being a section on the line 32—32 of Fig. 26 with the foot rest raised to the position in which the ratchet teeth are disengaged; and Fig. 30 being a similar section with the foot rest raised only a little, intermediate between the positions illustrated in Figs. 29 and 31;

Figs. 33–36 are other sections through the end of the ratchet mechanism shown in Figs. 24–27; Fig. 33 being a section on the line 33—33 of Fig. 24 with the foot rest down; Fig. 35 being a section on the line 35—35 of Fig. 25 with the foot rest partially raised; Fig. 36 being a section on the line 36—36 of Fig. 26 with the foot rest raised to the position in which the ratchet teeth are disengaged, and Fig. 34 being a similar section with the foot rest raised only a little, intermediate between the positions illustrated in Figs. 33 and 35;

Figs. 37–39 show three positions of the ratchet mechanism on the line 29—29 of Fig. 24, but showing the positions of the parts at three stages in the lowering of the foot rest;

Figs. 40–42 show three positions of the ratchet mechanism on the line 33—33 of Fig. 24, but showing the positions of the parts at the same three stages of the lowering of the foot rest as shown in Figs. 37 to 39;

Fig. 43 is a view similar to Fig. 4, but with an alternative head-rest adjusting mechanism; and Fig. 44 is a section on the line 44—44 of Fig. 43.

In Figs. 1, 2 and 6 the upholstery is shown. In other views of upholstered portions of the chair—except the chair back in Fig. 11—the upholstery is omitted in order to more clearly show the construction of the parts.

The drawings illustrate a chair in a railway car or the like, with the left side fastened to the wall of the car by a bracket 1 and the opposite end of the chair supported on the pedestal 2. The bracket and pedestal support the lower base assembly 3. The upper base assembly 4 is reversibly supported on the lower base assembly 3. Assembly 3 is cut away at 5 to provide room for the locking mechanism when assembly 4 is reversed. The seat backs 6 are pivotally supported at 7 at their lower ends and are held at a desired inclination by the reclining latch rods 8 which extend backwardly from the arms 9. The fronts of the arms are held by the arm supports 10. The two arms 9 at the outside edges of the chair are similarly constructed, and between the seats is the folding arm 13 which may be of any usual construction. The head rests 15 are pivotally supported at the tops of the backs 6. The foot rests 17 are attached to the rear of the upper base assembly 4. The rears of the seat portions 20 are movably supported in a manner to be explained, and the front portions are slidably supported on the buttons 22.

*The head rest*

In order to properly describe the head rest, brief reference will be made to the construction of the back. It is to be understood that the head rest and back can be constructed in any suitable manner, the invention lying principally in the means provided for adjusting the angle at which the head rest is inclined with respect to the back. As shown in Fig. 1, the head rest may be lowered until it is in substantially the same plane as the back, and it may be raised to form a relatively acute angle with the back. Three different positions are shown in Fig. 2 and these correspond with the tapered notches or openings 30 in the rack or latch quadrant 31 (Fig. 5). Any number of notches are provided to give any desired number of positions for the head rest.

The quadrants 31 at the two sides of the chair correspond with one another. The notches 30 are tapered axially of the latch rod 33 and the notches at both sides of the chair taper in the same direction so as to receive the tapered surfaces 35 of the latch rod when the rod is moved for engagement of these tapered surfaces with the notches. The latch quadrants 31 are located in a slot 36 and welded to a vertical wall of a hat-shaped member 37 behind the cover plate 38.

The latch rod 33 (Fig. 4) is contained in the latch housing 39. Adjacent the tapered surfaces 35 are the enlarged cylindrical surfaces 40 which fit snugly in the housing 39 and prevent the latch rod from rattling.

The pin 41 which is fastened in the housing by a press fit is located in a cutaway portion 42 of the portion 40 of the latch rod. (Right side of Fig. 4.) This pin limits the movement of the latch rod and prevents it from turning. The push-button cap 44 is fastened to the left end of the latch rod and the spring 45 presses against the left wall of the latch housing 46. The spring thus presses the latch rod to the left and keeps the tapered surfaces 35 seated against the notches 30. By tapering the surfaces 35 on the latch rod and spring pressing them in the tapered notches 30 of the latch quadrant, rattling of the rod against the quadrant is prevented.

In order to change the angle between the head rest and the chair back 6 the push button is depressed. This moves the tapered surfaces 35 out of engagement with the notches 30 and moves the cut-out portions 48 of the latch rod over the latch quadrant so that the head rest may be moved to any desired angular position. When the desired position is approximated the pressure on the push button is released and by the tapered surfaces 35 seating themselves in the nearest notches 30 the angular position of the head rest becomes fixed.

The construction of the head rest proper will be briefly outlined, it being understood that any head rest may be employed. The quadrant housing 46 is pivoted on pivot bushings 50 over the pivot 51, and is riveted or otherwise fastened to the vertical member 52 which is the major vertical stiffening member of the back. There is a back panel 53 fastened to the frame of the head rest. At the top of the head rest is the reinforcing bar 55. As shown in Fig. 6, this is located immediately forward of the upholstery channel 56.

The spring metal cover plate 57 is fastened to the back panel 53 of the head rest. It is bent back on itself, and its lower end presses on the plate 58 which is fastened to the back panel 59 of the lower portion of the back. The cover plate is always pressed against the plate 58, regardless of the angle to which the head rest is adjusted. The cover plate prevents a passenger from getting a finger pinched when the angle of the head rest is adjusted.

*Upholstery channel*

All of the drawings show upholstery channels such as that shown at 56, for holding the edges of the upholstery. Figure 3 shows the upholstery channel in detail.

The upholstery channel is formed of the channel member 59' which is welded or riveted or otherwise fastened to the back member or other stiff outside member of the chair 60'. The upholstery 61' covers the cushion 62', and its edge 63' is turned back about the bead 64'. This bead may be of heavy twine, plastic or the like. The turned-back portion 63' may be fastened to the outer portion 61', although this is not necessary. The upholstery is stretched taut, and the bead 64' is inserted in the channel and held there by pressure on the exposed upholstery while the stiff block 65' is forced into the channel by pounding or otherwise. This block may be made of vinyl plastic or other flexible, yieldable material. The lip or trim 66' covers the outside wall of the channel and also lies flat against the stiff outside member 60'. The inner edge of the block is notched at 67' and the notches squeeze the upholstery against the turned back inner end 68' of the upholstery channel. The block 65' is formed with an outwardly protruding point 69' which is engaged under the turned-back portion 70' of the channel, and the outwardly protruding portion 71' of the block reinforces the block opposite the end 68' of the channel to insure a tight grip on the upholstery.

It is not necessary that the upholstery be fastened in this manner, as other types of upholstered channels and blocks may be used and, furthermore, the upholstery may be tacked to the chair if desired.

*Gear engagement between back and seat portion*

The back and seat are supported by the upper base 4. The back support 60 (Fig. 6) rises from the bottom of the upper base. The gear bearing 61 is pivoted to this by the pivot 7. Its upper end is brazed or otherwise fastened to the reinforcing bar 36 of the back, or it may be otherwise fastened to the back in a manner to support the back on the pivot. Thus, the gear bearing and the back move together.

There are several teeth 65 at the bottom of the gear bearing 61. These mesh with the teeth 66 on the gear lever 67. This gear lever is pivoted at 68 to the back support 60. The back of the seat portion 20 is pivoted to the forward end of this lever at 69. In Fig. 6 part of the upholstery on the seat portion is broken away to show the bottom panel 71, the back reinforcing section 72, and the upholstery channel 73. The seat portion is not necessarily constructed as shown, but may be constructed in any desirable manner.

The front of the seat portion rests on the buttons 22, and as the back is raised and lowered the seat slides on these buttons. Because the teeth on the gear bearing mesh with the teeth on the gear lever and these two are each pivotally supported near the respective teeth, when the back is swung forward to the position shown in dot-dash lines in Fig. 6, the gear lever 67 rotates about the pivot 68 on back support 60, and this raises the back of the seat portion 20 to the position shown in dot-dash lines in Fig. 6. When the back is lowered the back of the seat portion is also lowered as indicated.

*The foot rest*

Each foot rest 17 includes a roller 80 which is supported at its two ends by the supports 81. Tooth plates 83 (Fig. 8) are riveted to each side of each support 81 by the rivets 84 (Figs. 9 and 10). There is a ratchet-release plate 85 adjacent the outer surface of each tooth plate.

Each support 81 and its ratchet-release plates 85 are pivoted around the bushing 87 and the bearing 88 which are fastened in the ratchet housing 89 by the machine screws 90. There is a circular slot 92 in each ratchet-release plate 85. A long stop pin 93 which is fastened in the support 81 extends into the circular slots in the plates 85 on the two sides of the support. As the support 81 and tooth plates 83 pivot about the bushing 87 the pin 93 moves in the slot 92.

The ratchet housing 89 is supported by the back member 95 (Fig. 15) of the upper base. The ratchet pawl 96 is supported in the housing by a pawl pin held by the machine screw 97 in same manner as bushing 87 is held by machine screws 90. Spring 98 between the front of the pawl pin and the back of the member 95 presses the pawl into engagement with the teeth 99 on the toothed members 85.

In operating the foot rest it may be lifted to any desired position and then lowered until any tooth 99 and the tooth 100 of the pawl are engaged. This supports the foot rest in a raised position and the number of positions in which the foot rest may be supported depends upon the number of teeth in the toothed plates. Figure 9 shows the bottom tooth 99 supported against the pawl tooth 100 and the foot rest cannot be swung to a lower position. In this position the long stop pin 93 is at the upper end of the slot 92. This tends to turn the ratchet-release plate counterclockwise. There is a cam 103 on the ratchet-release plate and in the position shown in Fig. 9 the upper edge of this cam is pressed against the short stop pin 104 which is fastened to the ratchet housing 89. This prevents movement of the ratchet-release plate in the counterclockwise direction and the slot 92 limits the movement of the pin 93 and the support 81 in this direction. This is the lowest point to which the foot rest can be turned.

To raise the foot rest it is turned in a clockwise direction and the pin 93 moves downwardly in the slot 92. When the last of the teeth 99 is engaged with the tooth 100 of the pawl the foot rest is in the position indicated by the letter A in Figs. 9 and 10. This shows the roller 80 in the highest position in which it can be used as a foot rest.

As will be seen from Fig. 10, it is possible to raise the foot rest to a higher position, and this is the position B of Fig. 10. When the foot rest is in the position A the pin 93 is at the bottom end of the slot 92. When the foot rest is raised to the position B the pin presses against the end of the slot and turns the ratchet-release plate in a clockwise direction. It will be noted that in Fig. 10 the upper edge of the cam 103 does not contact the pin 104. The cam has been moved in a clockwise direction and its bottom edge engages the top of the pawl tooth 100. This turns the pawl about the pin 97 in a counterclockwise direction. The extent of the movement is limited by the protuberance 106 on the edge of the ratchet-release plate. This protuberance is engaged with the pin 104 when the cam is in this position. With the pawl thus held out of engagement with the teeth 99 the foot rest can be lowered to its bottom position, which is the position C of Fig. 9. As the support is lowered the ratchet-release plate remains in the position shown in Fig. 10 so that the pawl is out of engagement with the teeth 99 until the foot rest approaches the position C (Fig. 9) when the pin 93 engages the upper end of the slot and turns the ratchet-release plate in a counterclockwise direction to the position shown in Fig. 9. The cam 103 is thus moved out of contact with the pawl pin, and the pawl pin is pressed by the spring 98 into engagement with the bottom tooth 99, as shown in Fig. 9.

Thus, as the foot rest is raised from any lower position to any upper position not higher than position A, the ratchet-release plate remains stationary and the long stop pin 93 moves downwardly in the circular slot 92. By engagement of any of the teeth 99 with the pawl pin the foot rest may be supported at any desired elevation. When it is desired to lower the foot rest from any raised position it is merely necessary to lift the foot rest to the position B so as to rotate the ratchet-release plate and disengage the pawl pin.

*Back adjustment mechanism*

The mechanism for adjusting the angle at which the reclining back is supported is located in the arms 9. By adjusting the angle of the back the angle of the seat portion is automatically adjusted simultaneously.

The front of the arm is supported on the stationary arm support 10. The front of the latch housing 110 (Fig. 11) is supported through the latch housing support 111 by the pivot 112 which is supported in the upper block 113 fastened in the arm support 10. The reclining latch rod 8 reciprocates in this latch housing.

Threaded bracket 116 is attached to cover plate 38. Threaded eye bolt 117 is screwed into this. A round socket-head cylinder screw 118 which passes through the counterbore hole of the eye bolt secures the latch rod 8 to the eye bolt. As the latch rod 8 is raised and lowered, the eye bolt turns in the bracket.

Latch cup 125 closes the front of the latch housing and latch cup 126 closes the rear. Just forward of the cup 126 is a stop 127. The spring 128 is held under tension between this stop and the front 129 of the latch rod 8. The upper portion 130 of this front extends upward through the slot 131 in the latch housing. This member 130 serves as a latch which is engageable in any of the openings 135 of the latch channel 136. The rear end of this channel is pivoted on the pin 138 which is fastened in the channel housing 139.

There is a knob 140 fastened to the forward end of the latch channel and when the position of the back is to be changed it is merely necessary for the person using the chair, or an attendant, to lift the knob so that the bottom of the latch channel is raised above the latch 130. The spring 128 then pushes the front 129—130 forward and the back is raised. The angle of the back is determined by the opening 135 in which the latch 130 is engaged. The back is lowered by similarly lifting the knob and by the occupant of the seat lying back to add his weight to the weight of the seat back. Alternatively, pressure on the back may be used to lower it when the knob is raised. The latch rod 8 slides in the fiber or nylon bushing 141.

The spring 142 normally presses the latch channel against the bottom of the latch housing 139. The top of this spring presses against the member 144 (Fig. 14), the ends of which are held in the housing 139. At the front of the housing is the clip 145. The housing is covered and upholstered in any suitable manner.

*The upper and lower base assemblies*

Figure 15 shows the upper base assembly 4 locked directly over the lower base assembly 3, parts of the upper base assembly being cut away to show the lower base. In Fig. 15 the front of the upper base assembly is at the bottom of the sheet and the back is at the top of the sheet, as indicated by the ratchet housings 89 and foot rest arms or supports 81.

In Fig. 20, as indicated by the arrows, the upper base assembly is shown in an exaggerated position, away from the wall of the vehicle, to clearly show the locking members disengaged. In Fig. 21 the upper base assembly has been revolved about the lower base assembly through almost a complete cycle of 180° and the front of the upper base assembly is approaching the back of the lower base assembly. In order to rotate the upper base assembly about the lower base assembly the foot rests must be raised. The shape of the arms of the foot rest is such that the lower base raises them automatically as the upper base assembly is rotated. Stops prevent the upper base assembly from being revolved completely about the lower base assembly because the foot rests and backs would interfere with the wall. However, the upper base assembly can be turned through 180° and locked on the lower base assembly so that the seat faces in the reverse direction from which it faces in Fig. 15. The mechanism for doing this will now be explained.

Reference has already been made to the brackets 1 (Figs. 1 and 15) which support the end of the lower base assembly which is adjacent the wall. There has also been reference to the pedestal 2 which supports the opposite end of the lower base assembly.

The lower base member is formed with the back member 95 and a corresponding front member 150. Between the end members or brackets 1 and the front and back members 149 and 150, are the front and back center members 151 and 152. The cross members of the lower base are the plates 154 and 155 which form the first and second cross members, the angles 156 and 157 which form the third and fourth cross members, and the outside angle 158 which is slotted at 159 and 160 and forms the fifth cross member. There are two brace members 163 and 164.

The upper base assembly is formed of the front channel 165, the rear tube 95, the end angles 167 and end angle reinforcements 168. At the center of the upper base assembly is the center hat section 169. In Figs. 15, 20 and 21 the upper portion of this is broken away in order to more clearly show the parts below it. Figure 16 shows a section through the complete center hat section 169 of the upper base assembly and shows how it is welded to the rotary center strap 170 at its center. The central portion of the center hat section overlaps the front member 150 as shown in Figs. 15, 20 and 21 and its rear is supported by the plates 172 which are fastened to the rear tube 95. The hold-down plate 175 is used to hold the upper and lower base assemblies together during the rotation cycle and is located below the hat section a distance equal to the height of the angles 156 and 157. The ends 176 of this hold-down plate are beveled slightly to facilitate turning them under the angles 156 and 157. The threaded studs 178 are welded to the hold-down plate and extend upwardly through the rotary center strap 170 and the side flanges of the center hat section. The bearings 179 and bushings 180 surround these studs, and the parts are held in place by the nuts 181.

Connecting the upper and lower base assemblies are two telescoping links 182 and 183, which are both extensible and compressible. They are used for holding the assemblies together while pivoting the upper base assembly on the lower base assembly, and also for locking the seat in either the forward-facing or the rearward-facing position. The construction of the links will be described first, and then their functioning.

One end of each link is fastened to the upper base assembly through one of the bushings 180. The other end is fastened to a bushing 185 which is mounted on a shouldered stud 186 on the lower base assembly. Bushing 185 is separated from stud 186 by bushing 187. The bushings are held in place by washers 188 and pins 189.

The outer housing 190 of each link is welded to the bushing 180. There is a rectangular opening 191 at the top and bottom of the housing at the end of the housing nearest the stud 186 and a rectangular opening 192 at the opposite end of the housing. The round lug 193 is welded to the bushing 185 and fits in the open end of the outer member or housing 190. The open ends 194 of the U-member 195 are fastened to the bushing 185 adjacent the round lug 193, and the closed end 196 of this U-member fits in the housing 190. The spring plate 198 fits in the opening 191 adjacent the round lug, and the spring plate 199 fits in the opening 192 near the closed end 196 of the U-member. The spring 200 is located between the spring plates and is under slight compression so that it presses the plates to the outer ends of the respective openings 191 and 192. A large button (not shown) is pressed into the center of each spring plate, and these buttons are faced toward the spring and enter its opposite ends, and hold the spring plates in position.

In an alternative construction, the lug 193 and U-member 195 are formed as a single piece with an opening therein extending from the outside edge of opening 191 to the outside edge of opening 192, with the spring 200 and spring plates located in this opening.

Simple locking means is provided to lock the upper base assembly in position over the lower base assembly. There are four buttons 205, 206, 207 and 208 which project downwardly from the four corners of the upper base assembly. There are four slots, 160 and 159 in the outside angle iron 158, and 210 and 211 in the hold down plates 213 of the lower base assembly. The four buttons are releasably engaged in these respective slots when the upper and lower assemblies are locked in position, as shown in Fig. 15. When the upper base assembly is reversed the buttons 205, 206, 207 and 208 are engaged in the slots 210, 211, 160 and 159 respectively. The slots 210 and 211 are in the hold-down plates 213 which are welded to the first cross member 154. Figure 19 shows the button 205 engaged in the slot 160 in the fifth cross member 158. In Fig. 1, the upper right hand corner of the lower base assembly 3 is cut away to provide for rotation of the upper base assembly thereon without interference from the buttons.

The spring 200 in either link is compressed whenever the link is either shortened or lengthened. When the link is shortened, the outer edge of the opening 192 presses the spring plate 199 against the right end of the spring and compresses it. When the link is lengthened, the outer edge of the opening 191 presses the spring plate 198 against the other end of the spring and shortens it. Each spring tends to bring its link to the normal position shown in Fig. 17 in which the spring plates are pressed against the outer edges of their respective openings 191 and 192. Consequently, when the upper base assembly is locked above the lower base assembly (either as shown in Fig. 15 or with the upper base assembly faced in the opposite direction) the links are preferably in the normal position. This keeps the assemblies locked in this position, and prevents the upper base assembly from shifting toward the aisle and becoming unlocked. Some variation from this is possible, as for example by having one link somewhat extended and the other somewhat shortened, and some such variation may prove desirable.

To unlock the upper base assembly, so that it may be rotated, it is slid on the lower base assembly away from the wall until the buttons 205, 206, 207 and 208 are disengaged from the respective hold-down slots. To do this, one link must be extended and one must be shortened, and the spring in each is compressed. During rotation through 180° the extended link is made shorter than normal and the shorter link is made longer than normal. When the seat has been reversed, both springs are compressed, and in extending to normal position (Fig. 17) the upper base assembly is forced to the wall and the buttons are locked in the hold-down slots.

One of the ends of the hold-down plate is always engaged under one of the cross members 156 and 157. Figure 20 shows the two ends engaged under the respective cross members. In Fig. 15 one end of the hold-down plate is engaged under one cross member, and in Fig. 21 it is engaged under the other cross member. The hold-down plate prevents the upper base assembly from being lifted off of the lower base assembly. The spring links maintain the two assemblies in the proper relative positions toward one another regardless of the stage of the reversal of the seat. Figure 21 shows the reversal of the upper base assembly as almost complete, and when it is completed the front and back members of the upper base assembly will be immediately above the front and back members of the lower base assembly, and the two assemblies will then be locked by engaging the buttons in the slots as previously explained. The springs in the links prevent the assemblies from becoming unlocked by unintentional disengagement of the buttons from the slots because this would necessitate increasing the compression of the springs. This can only be done by intentionally pulling the upper base assembly outwardly from the wall of the vehicle.

*Alternative foot rest*

An alternative form of foot rest is shown in Figs. 22 to 42. The foot rest rollers 231 may be of the same construction as the rollers 80 of the earlier views or any other construction. Figure 22 illustrates one full length of housing 232 and a portion of the second housing. These two housings are identical but the reverse of one another. The supports 233 at the outer ends of the double housing and the tube shaft or support 234 between the housings are connected to the back member 95 of the upper base assembly. The stationary ratchet member 236 at the end of the housing is thus made integral with the upper base assembly. The inner end of the housing 232 is rotatable on the tube shaft 234 which is bolted to the casting 238 which in turn is suitably supported by the member 95 of the upper base assembly. At the top rear of this tube shaft is the stop 240 and at the bottom is the stop 241. The roller 231 is supported from the housing by the arms 243.

The housing 232 is generally cylindrical. The outer end 245 is flat. There is a cam 246 (Fig. 23) at the inner end which abuts against the stops 240 and 241 when the roller is in the elevated and the lowered positions, respectively. The plate 248 is suitably fastened inside of the housing 232 some little distance from its inner end. A spring 249 is compressed between this plate and a corresponding plate in the companion housing, and presses the housing outwardly toward the ratchet 236.

The ratchet mechanism which controls the movement of the foot rest is located in the outer end of the housing. The rotatable ratchet member 253 is welded in the housing 232. The ratchet teeth 256 at the outer end of the member 253 mesh with the ratchet teeth 257 at the inner end of the member 236. In Figs. 24 and 25 only one tooth is shown because the teeth are meshed with one another. In Figs. 26 and 27 the teeth 256 and 257 are both shown because here the teeth are not engaged with one another. The mechanism for holding the teeth apart will now be explained.

The ratchet releases 260 and 261 are identical. One of them is shown in perspective in Fig. 28. Both are formed with three tapering teeth 262, the outer extremities 263 of which are notched. In Figs. 24 and 25 the tapering teeth 262 of the two releases are engaged with one another. In Figs. 26 and 27 the notches 263 are engaged with one another.

The opposite end of each of the releases is cut away at three places at 265. It is to be understood that the number of cutaways 265 and the number of teeth 262 may be varied, and the number of cutaways is not necessarily the same as the number of teeth. The cutaways are shown with vertical walls but this is not essential.

Between the cutaways 265 of the release 260 are three projections 267, 268 and 269. The corresponding projections of the release 261 are identified by the reference numerals 270, 271 and 272. There are three pins 274, 275 and 276 (Fig. 29) which project outwardly from the bottom of the member 253 into the three cutaways 265 of the release 260 and there are three pins 278, 279 and 280 (Fig. 33) which project inwardly from the stationary member 236 into the three cutaways 265 of the release 261. The operation of the ratchet mechanism as the foot rest is being raised will be explained by referring to Figs. 29–36, and the lowering of the foot rest will be explained by referring to Figs. 37–42 all of which show the ratchet members 236 and 253 and associated parts in different relations.

The releases 260 and 261 are slidably mounted on the short tube 285 (Fig. 27). The rubber bushing 287 fits snugly inside of this tube, is fastened to it, and protrudes a short distance from each end (Fig. 27). When the ratchet teeth are engaged as in Fig. 24 the ends of the bushing 287 which protrude slightly beyond the ends of the tube are pressed against the bottoms of the ratchet members 236 and 253 as shown in Figs. 24 and 25. When the ratchet teeth are disengaged as in Figs. 26 and 27 the tube and rubber bushing float between the ratchet members 253 and 236.

The operation of the foot rest is best understood by first referring to Figs. 29–36. Figures 29 to 32 show changes in the relation of the parts in the plane of line 29—29 of Fig. 24 as the foot rest is raised, and Figs. 33 to 36 show changes in the relation of the parts in the plane of the line 33—33 of Fig. 24 at identical stages in the raising of the foot rest.

Figure 29 is a section through the three projections 267, 268 and 269 of the ratchet release 260 and through the pins 274, 275 and 276 which are fastened in the member 253. Figure 29 shows the relation of these parts to one another when the foot rest is in its lowest position. Figure 33 shows the three projections 270, 271 and 272 of the release 261, and the three pins 278, 279 and 280 which are fastened in the member 236. This likewise represents these parts when the foot rest is in its lowest position.

Figures 30 and 34 show the relation of these parts when the foot rest is raised a short distance. The angle of the arms 243 in the several views indicates the position of the foot rest. In order to simplify the explanation we shall follow the relative positions of the projection 268 and pin 275 in Figs. 29 to 32, and the relative positions of the projection 270 and pin 280 in Figs. 33 to 36. The position of the pin 275 relative to the housing 232 and the arms 243 does not change. Similarly the position of the pin 280 with respect to the stationary member 236 and supports 233 does not change. In other words, the pin 280 remains stationary at all times and the pin 275 moves with the arms 243. The description therefore refers more particularly to the movement of the projections, and this is of course a description of the change of position of the releases 260 and 261.

Comparing the position of the pin 275 in Fig. 30 with its position in Fig. 29 it is seen that as the foot rest is lifted the pin is rotated in the clockwise direction and moves out of contact with the projection 267 and into contact with the projection 268 which is then immediately ahead of it. During this movement of the pin there is no movement of the projections 267 and 268 and, therefore, no movement of the release 260. Comparing Figs. 34 and 33 it is seen that when the arms 243 are raised from the position shown in Fig. 33 to that shown in Fig. 34 there is no change in the relation of these parts. Therefore there has been no movement of either release.

As the roller is raised to a higher position and the arms 243 are raised to the position shown in Figs. 31 and 35, the pin 275 has pushed the projection 268 through the same angle that the arms 243 have been moved. Thus the pin 275 and the release 260 are both rotated the same amount as the arm 243. During this movement the projection 270 (Fig. 35) has been moved into contact with the pin 280. Figures 31 and 35 are sections on the respective section lines of Fig. 25 and we see that the releases 260 and 261 are still in close contact with one another. They have not moved apart while the arms 243 have been moved from the position shown in Figs. 29 and 33 to the position shown in Figs. 31 and 35. The ratchet teeth are therefore kept in mesh by the pressure of spring 249.

Figures 32 and 36 are sections of Fig. 26 and we see that when the arms are raised to this vertical position the slanting edges of the two releases slide over one another and the notches 263 become engaged with one another, holding the releases apart. In separating to the position shown in Fig. 26 the member 253 is moved to the left against the action of the spring 249. In Figs. 24 and 25 the ends of the rubber bushing are shown, but when the releases 260 and 261 are moved apart to the position shown in Fig. 26 the bushing floats inside of the releases and its outer ends are no longer pressed against the member 236. As further shown in Fig. 26 the teeth 256 and 257 of the ratchet are disengaged. In other words, by raising the arms 243 from the position shown in Figs. 25, 31 and 35 to the position shown in Figs. 26, 32 and 36 the releases are spread apart and the ratchet teeth become disengaged. The vertical position of the arms 243 shown in the latter figures is above the top supporting position of the foot rest because in any supporting position of the foot rest the teeth 256 and 257 of the ratchet must be engaged with one another.

The separation of the ratchet teeth is brought about in the following manner. When the arms 243 are raised to the vertical position (Figs. 26, 32 and 36) the pin 275 is moved to the position shown in Fig. 32 and the release 260 is moved with it, as shown by the change in the position of the projection 268. As the release 260 is moved to this extreme position the tendency is for the release 260 to move the release 261. However, as shown in Fig. 35, the projection 270 has been already turned against the immovable pin 280, and Fig. 36 shows that there is no further change in the position of the projection 270. Although the release 261 cannot be rotated further than to the position shown in Fig. 26, the release 260 is not stopped from further rotation because the contacting surfaces of the two releases are slanting and permit the release 260 to slide away from the release 261 against the action of the spring 249 until the notches 263 of the two releases are engaged with one another as shown in Fig. 26. Actually, it is necessary that only one of the releases be notched, but the production of the releases is facilitated by having them identical.

The spring 249 not only presses the releases together, but simultaneously presses the member 253 against the member 236, and except when the notches 263 are engaged and keep the releases apart, this spring keeps the ratchet teeth 256 and 257 in mesh with one another as shown in Figs. 22, 24 and 25. When the notches are engaged, as in Figs. 26 and 27, the ratchet teeth are held out of contact. It is the ratchet teeth which hold the foot rest in the various raised positions in which it is used as a foot rest. When raised to the vertical position (Figs. 26, 27, 32 and 36) the teeth are out of mesh, and the foot rest is above its top supportable position. When the person who has lifted the foot rest to this position, releases his grip, the foot rest falls. During most of its fall the notches 263 are engaged and hold the releases apart and keep the ratchet teeth out of mesh. At the bottom of the fall, the momentum of the falling foot rest disengages the notches, and the releases, etc. return to the relation illustrated in Fig. 24, with the ratchet teeth 256 and 257 in mesh with one another. The bushing 287 cushions the fall. The manner in which this is accomplished will now be explained.

Figures 37–42 illustrate the relative positions of the projections of the releases 260 and 261 and the pins as the foot rest is lowered. Figure 40 shows that as the arms 243 start downward the position of the pins and projections of the release 261 is identical with that shown in Fig. 36, because there is no immediate change in the position of the release 261. However, Fig. 37 shows that although the projection 268, and therefore the release 260, has not moved from the position shown in Fig. 32, the pin 275 which moves with both the housing 232 and the arms 243 has moved counterclockwise.

In the next stage, as the foot rest is lowered, the pin 275 which moves with the arms 243, moves the projection 267 to the position shown in Fig. 38. There is necessarily a corresponding change in the position of the release 260 because the projection 267 is a part of this release. The two releases are engaged by their notches and therefore the release 261 is moved through a like angle, and that is illustrated by the movement of the projection 271 against the pin 280 as illustrated in Fig. 41. The release 261 can move no further in this direction because the pin 280 is immovable. This means that on any further downward movement of the arms 243 the position of the release 261 will not change.

In moving from the position illustrated in Figs. 32 and 36 in which the roller of the foot rest is in its top position, as indicated by the position of the arms 243, the roller is simply dropped. The ratchet teeth are out of engagement with one another and there is no resistance to the downward movement of the foot rest. When the parts reach the position illustrated in Figs. 38 and 41 considerable momentum has been gained. The release 261 can turn no further and the momentum of the foot rest causes the teeth 263 of the two releases to become disengaged. This is possible only because the undersurface 288 (Fig. 26) of the upper side of the notch 263 of the release 260 and the top surface 289 of the notch of the release 261 are at an angle. The disengagement of the notches permits the release 260 to rotate further in the counterclockwise position, and this is illustrated in Fig. 39 which shows that the pin 275 which moves with the arms 243 has caused the release 260 to rotate to a new position, its bottom position, although the relation of the parts as illustrated in Fig. 42 has not been changed. Engagement of the cam 246 with the stop 241 (Fig. 23) limits the downward movement of the foot rest.

When the notches 263 of the releases are thus disengaged the spring 249 brings the releases together again, to the position illustrated in Fig. 24, and the ratchet teeth are again brought into mesh. Thus, with the arms 243 in the position shown in Figs. 39 and 42 the ratchet teeth are engaged and the relation of the pins and releases is the same as that illustrated in Figs. 29 and 33. With the ratchet teeth again engaged the foot rest may again be raised to any desired position.

With this understanding of the mechanism it is clear that as the arms are raised the ratchet teeth are engaged with one another and the foot rest may be supported at any position at which the ratchet teeth are engaged. The number of supportable positions is not indicated in any manner by Figs. 29 to 36. This is entirely dependent upon the number of the ratchet teeth. The larger the number of ratchet teeth the larger the number of supportable positions. The top position of the foot rest, a position above the top supportable position, is illustrated in Figs. 32 and 36, and in this position the cam 246 (Fig. 23) is brought against the stop 240. In this position the notches are engaged as illustrated in Fig. 26 and the ratchet teeth are out of mesh. Because of the abutment of the cam 246 against the stop 240 it is impossible to further rotate the ratchet releases with respect to one another. The notches 263 remain engaged with one another until the downward momentum of the foot rest disengages them when the pins 274, 275 and 276 attached to the member 253 force the relative rotation of the two releases while the pins 278, 279 and 280 attached to the member 236 prevent rotation of the release 261.

Thus the foot rest can be raised to any of a number of supportable positions at which it is supported by the ratchet teeth. Once the foot rest is raised a small amount it cannot again be lowered until it is raised to the vertical position beyond the top supportable position to disengage the ratchet teeth. The foot rest may then be dropped to the bottom position at which the ratchet teeth are re-engaged. The foot rest may then again be raised to any desired position.

*Alternative headrest operation*

The headrest shown in Figs. 43 and 44 uses the same type of headrest adjustment mechanism as shown in Figs. 4 and 5, but the means for operating it is different. The latch rod 300 is adapted to move axially through the housing 301, and the tapered surfaces 302 engage in different notches in the tops of the quadrants 304. The plate 305 is fastened to the latch housing 306, and the arm 307 is pivoted onto it at 308.

The pin 310 is fastened to the latch rod 300 and extends through the opening 311 in the housing 301. The arm 307 is slotted at 312 and the pin 310 is located in the slot. Thus the rod 300 is moved in one direction or the other by movement of the arm 307. Such movement is provided by the push button 313 which is connected with the arm 307 by the rod 314.

The spring 316 is fastened at its upper end 317 to the metal back plate of the chair. The lower end 318 is fastened into the arm 307. The spring holds the horizontal portion of the arm 307 up and thus by means of the pin 310 holds the rod 300 with the tapered surfaces 302 engaged in one of the notches at the top of each quadrant 304. This holds the headrest in any one of the several positions to which it may be moved. When the push button 313 is depressed the horizontal portion of the arm 307 is pushed down and this pushes the pin 310 to the left disengaging the tapered surfaces 302 from the quadrants 304. This permits the headrest to be moved to any desired angle. As soon as such pressure is removed from the push button 313, the spring lifts the horizontal portion of the arm 307, and the tapered surfaces 302 are seated in the appropriate notches in the quadrants 304. Thus the angle of the headrest with respect to the balance of the back of the seat may be adjusted to any desired angle.

As explained, the seat has many novel features. Minor modifications in the mechanism which has been illustrated can be made without departing from the scope of the appended claims which define the invention.

What I claim is:

1. A vehicle seat with a back, and extending upwardly from each side of the back a quadrant rigidly fastened to the back and having several indentations in the upper edge thereof, the indentations in the two quadrants being equal in number and alike, a frame for a head rest pivotally attached to the top of the back, rigidly fastened across the frame from one side of the head rest to the other a housing with a slot in the bottom thereof near each end, with the tops of the quadrants located in the respective slots, and rod means slidable in the channel and engageable in one of the indentations in each quadrant depending upon the position of the quadrants in the frame.

2. The vehicle seat of claim 1 in which all of the indentations taper in one direction axially of the rod, the surfaces of the rod normally seated in the indentations being provided with a corresponding taper whereby the friction between the surfaces thereof locks them together, and means for separating the surfaces.

3. A vehicle seat with a back, and extending upwardly from each side of the back a quadrant rigidly fastened to the back and having several indentations therein, the indentations in the two quadrants being equal in number and positioned opposite one another, a frame for a head rest pivotally attached to the top of the back, a rod supported by the head rest and locatable in two opposite indentations of the quadrants and movable crosswise thereof, both the indentations and the surfaces of the rod located therein being tapered so that the friction therebetween holds the surfaces together, and means for separating the surfaces in order to engage the rod with different indentations.

4. A vehicle seat with a back and extending upwardly from each side of the back a quadrant rigidly fastened to the back and having several indentations in the upper edge thereof, the indentations in the quadrants being equal in number and opposite one another, a frame for a head rest pivotally attached to the top of the back, a rod fastened across the frame and provided with notches which in one position of the rod straddle the respective racks, the rod in another position being located in one of the indentations in each quadrant whereby the head rest is held immovably with respect to the back, all of the indentations in both quadrants tapering in one direction axially of the rod, the two portions of the rod which are located in indentations when in said other position being complementarily tapered so that the friction between the surfaces thereof holds the surfaces together, and means for separating the surfaces.

References Cited in the file of this patent

UNITED STATES PATENTS

| | | |
|---|---|---|
| 573,147 | Higgins | Dec. 15, 1896 |
| 805,863 | Knight | Nov. 28, 1905 |
| 942,603 | Undeland | Dec. 7, 1909 |
| 1,860,058 | Schwarzkopf | May 24, 1932 |
| 1,930,867 | West | Oct. 17, 1933 |
| 1,939,954 | Campbell | Dec. 19, 1933 |
| 1,977,159 | Tursi | Oct. 16, 1934 |
| 2,028,633 | Thomas | Jan. 21, 1936 |
| 2,066,901 | Preble | Jan. 5, 1937 |
| 2,095,561 | Bell | Oct. 12, 1937 |

(Other references on following page)

UNITED STATES PATENTS

| | | |
|---|---|---|
| 2,099,460 | Bell | Nov. 16, 1937 |
| 2,217,352 | Todd et al. | Oct. 8, 1940 |
| 2,232,775 | Drake | Feb. 25, 1941 |
| 2,252,970 | Gedris | Aug. 19, 1941 |
| 2,284,129 | Caesar | May 26, 1942 |
| 2,472,349 | Smith | June 7, 1949 |
| 2,567,626 | Trouslot | Sept. 11, 1951 |
| 2,613,725 | Woodhall | Oct. 14, 1952 |
| 2,627,902 | Cook | Feb. 10, 1953 |

FOREIGN PATENTS

| | | |
|---|---|---|
| 373,250 | Great Britain | May 17, 1932 |